United States Patent
Zheng (10) Patent No.: US 11,929,963 B1
(45) Date of Patent: Mar. 12, 2024

(54) INTERACTIVE DIAGNOSIS OF APPLICATION PERFORMANCE USING A CHATBOT

(71) Applicant: T-Mobile USA, Inc., Bellevue, WA (US)

(72) Inventor: Pei Zheng, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 125 days.

(21) Appl. No.: 17/368,084

(22) Filed: Jul. 6, 2021

(51) Int. Cl.
*H04L 51/02* (2022.01)
*G06F 8/77* (2018.01)

(52) U.S. Cl.
CPC ............... *H04L 51/02* (2013.01); *G06F 8/77* (2013.01)

(58) Field of Classification Search
CPC .................. H04L 51/02; G06F 8/77
See application file for complete search history.

(56) References Cited

U.S. PATENT DOCUMENTS

| | | | |
|---|---|---|---|
| 2005/0155031 A1* | 7/2005 | Wang ................. | G06F 9/44505 717/170 |
| 2018/0219807 A1* | 8/2018 | Thinguldstad ......... | G06N 3/006 |
| 2020/0065218 A1* | 2/2020 | Bhosale ............... | G06F 11/366 |
| 2020/0304636 A1* | 9/2020 | Trim ................... | H04L 67/5683 |

* cited by examiner

*Primary Examiner* — Soe Hlaing
(74) *Attorney, Agent, or Firm* — Perkins Coie LLP (57) ABSTRACT

A chatbot executes on a user device to gather performance data associated with an application on the user device. During a diagnostics chat with a user, the chatbot receives a plurality of answers from a user of the user device to a plurality of prompts sequentially output by the chatbot to the user regarding a performance issue of an application on the user device. The chatbot also retrieves, from the user device, contextual data of the application during the performance issue. The chatbot packages the answers received from the user and the retrieved contextual data to enable diagnosis of the performance issue of the application.

20 Claims, 3 Drawing Sheets

INTERACTIVE DIAGNOSIS OF APPLICATION PERFORMANCE USING A CHATBOT

BACKGROUND

Users of computing devices interact with a wide variety of software applications on their devices. At times, these software applications encounter performance issues where the applications do not perform as expected. Some applications or user devices send logs or traces generated by the application to an administrator if the application encounters certain types of problems, such as if the application crashes. However, the reports that are sent to the administrator in these circumstances—sometimes called crash reports—capture only limited types of performance issues that may arise in an application. Crash reports also do not obtain any information from the user of the application, even though the user may have information that is valuable to diagnosing or resolving some performance issues.

BRIEF DESCRIPTION OF THE DRAWINGS

Detailed descriptions of implementations of the present invention will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

A chatbot executing on a user device interactively converses with a user to gather information about application performance issues on the user device, while also querying the device for contextual data associated with the performance issues. The chatbot employs a conversation model to sequentially output prompts to the user and receive answers to the prompts from the user. Based on the prompts and/or the user answers, the chatbot retrieves contextual data associated with actions of the application, performance of the user device, or performance of a network used by the user device, at a time leading up to or coinciding with the performance issues of the application. The contextual data and user answers are packaged for analysis. For example, the packaged data can enable an administrator of the application to diagnose a problem with the application that caused the performance issue, or the data can enable a network operator to improve the network over which the user device communicates.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Figure 1:
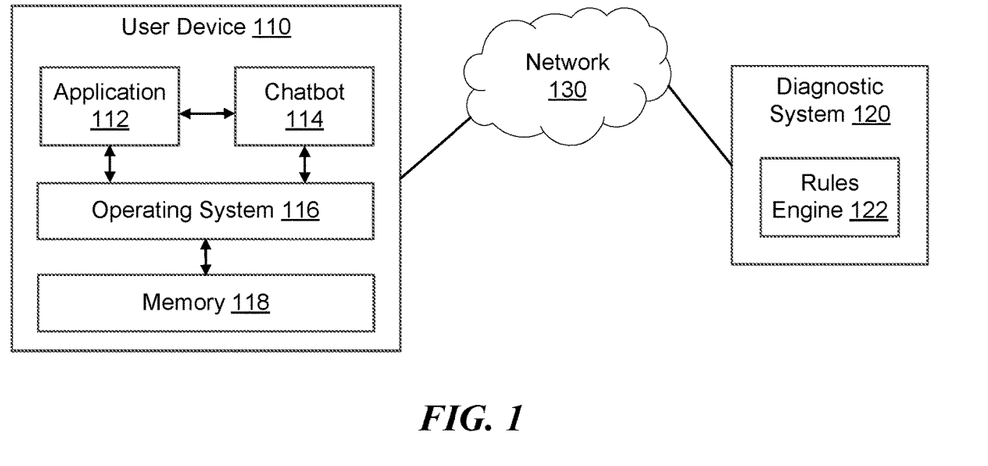
FIG. 1 is a block diagram that illustrates an environment in which some implementations of a diagnostics chatbot operate.

FIG. 1 is a block diagram that illustrates an environment 100 in which some implementations of a diagnostics chatbot operate. As shown in FIG. 1, the environment 100 includes a user device 110 and a diagnostic system 120, which communicate with one another over a network 130.

The user device 110 is a computing device that outputs information to and receives inputs from a user. Examples of the user device 110 can include mobile devices such as mobile phones or tablets, wearable devices such as smart watches or smart glasses, laptop computers, desktop computers, smart televisions, IOT devices, or other devices that are capable of outputting information to users, receiving inputs from users, and communicating with the diagnostic system 120 over the network 130. In some implementations, the user device 110 is a collection of two or more devices communicatively coupled to one another, such as a mobile device coupled to a smart television while the television streams content. As shown in FIG. 1, the user device 110 includes an operating system 116 and a memory 118, and executes an application 112 and chatbot 114.

The operating system 116 includes software that supports basic functionality of the user device, such as provisioning resources for higher-level software applications on the user device, interfacing with hardware such as input or output devices, and managing the memory 118. The operating system 116 provides application programming interfaces (APIs) that interface with devices or subsystems within the user device 110, such that each API can output information associated with the device or subsystems. For example, a location API returns a latitude and longitude of the user device 110, as measured by a global positioning sensor in the user device 110. A battery status API returns information about a battery in the user device 110, such as an amount of charge remaining, whether the battery is currently recharging, or a temperature of the battery. A memory status API returns information about a current amount of memory that is in use or available.

The memory 118 includes one or more devices capable of storing information temporarily or permanently. A processor in the user device 110 can read data from or write data to the memory 118 to facilitate operations of the user device 110 and its software, including the operating system 116, the application 112, and the chatbot 114.

The user device 110 also executes one or more applications 112. The application 112 represents user-interactive software, which in some cases can be executed within the operating system 116 of the user device 110 (for example by a processor executing instructions stored in the memory 118). A user of the user device 110 interacts with one or more applications to perform one or more tasks. For example, the application 112 is a messaging application that is used to perform the tasks of receiving or sending messages, a mobile calling application that is used to perform the tasks of placing or receiving phone calls, a video streaming application that is used to perform the task of playing video content, a social networking application that is used to perform the tasks of sending or receiving messages or sharing or receiving shared content, and so on.

During use of the application 112, the application writes various forms of data to the memory 118. Depending on the functionality of the application, the data written to memory can include any of a variety of logs related to actions performed within the application, timestamps of the actions, locations of the actions (e.g., global positioning coordinates of the user device 110 at the time the action was initiated or completed), success or failure codes, or metadata related to content shared during an action (e.g., file size). Other subsystems or application of the user device 110 may also write data to the memory 118 that coincides in time with actions performed within the application 112. For example, this information can include information about available network connections, movement of the device, battery level, temperature of the device or one of its components, the time the device was last restarted, recent call drops, or operations performed by other applications.

The application 112 may occasionally encounter a performance issue where some functionality of the application is unavailable or is not operating according to expected behavior. Within a messaging application, for example, messages may not be sent or received, may be sent or received slowly, may be duplicated, and so on. A phone application may encounter a performance issue where phone calls are not sent or received or have poor sound quality. A video streaming application may continually pause videos during playback and/or repeatedly buffer, while a social networking application may fail to upload user images or videos. Performance issues of the application can arise for a variety of different reasons, including problems with the application itself (e.g., a bug in the application's code), problems with the user device 110 (e.g., insufficient available memory), and/or problems with a network over which the application communicates (e.g., insufficient bandwidth). Other performance issues may be perceived anomalous or incorrect behaviors, but that originate, for example, from nonintuitive user interfaces or application settings that cause the application to perform differently than the user expects it to perform.

The chatbot 114 facilitates conversation with a user of the user device 110 to diagnose performance issues associated with the application 112. The chatbot includes software executed by the user device 110 that facilitates an automated conversation with the user of the user device. Applying a conversation model, the chatbot sequentially outputs prompts to a user to retrieve information about the performance issue. The chatbot can engage in a conversation with the user by natural language processing—that is, translating a user's answer to a first prompt and processing the request to generate an appropriate response or second prompt in accordance with the answer to the first prompt. It is contemplated that various types of machine learning (ML) algorithms/deep learning (DL) algorithms through supervised and unsupervised learning can also be applied to learn new patterns of chatbot prompts and user answers that can be understood by both humans and machines over time. The conversation model used to generate the chatbot prompts can be generated and managed by the diagnostic system 120, which provides to the chatbot 114 the conversation model itself or prompts selected using the conversation model.

Communications between the chatbot 114 and a user can be facilitated by any type of messaging service, such as a messaging platform integrated into the application 112, a dedicated messaging application associated with the chatbot 114, or a pre-existing instant messaging service such as a short message service (SMS) application, Facebook Messenger, or WhatsApp. Some aspects of the communications between the chatbot 114 and the user are described herein as being text-based communications, although some implementations of the chatbot 114 instead converse with the user via audio communication (e.g., in a manner similar to interactive voice response (IVR) systems), video communication, or augmented reality or virtual reality.

The chatbot 114 can initiate conversations with a user in response to detecting a potential performance issue associated with the application 112. Some implementations of the chatbot 114 detect the potential performance issue by detecting anomalous behaviors of the application. To detect anomalous behavior, the chatbot 114 can execute rules, based on the type of application, that if satisfied cause the chatbot 114 to determine the application's behavior is potentially anomalous. For example, the chatbot 114 identifies anomalous behaviors if certain characteristics of displayed content are detected (e.g., duplicate messages), if the application freezes for more than a threshold duration of time, or if the application is using greater than a threshold amount of memory. When anomalous behavior of the application is detected, the chatbot 114 can send a prompt to the user with an opportunity to begin chatting about the performance issue. For example, a popup within the application states, "It looks like the application is having some issues. Would you like to chat with a chatbot to help us improve the application?" The popup can include a link that, if selected, starts the conversation with the chatbot 114. Any of a variety of other prompts can be provided in addition to or instead of an in-application popup, such as a push notification, a text message, an email, or a message within the messaging service used by the chatbot.

Other implementations of the chatbot 114 detect a potential application performance issue by inference based on actions of the user. Some applications can be associated with a customer service phone number that users may dial when an issue with the application is encountered. Thus, in one example, the chatbot 114 detects a potential performance issue with the application if it detects the user is dialing the customer service phone number. In response, the chatbot 114 can send a prompt to the user stating, for example, "There is a ten-minute wait to speak to a representative. Would you like to chat with a chatbot while you wait?" In other examples, the chatbot 114 detects potential performance issues if the user restarts the application more than once or if the user restarts the user device 110 while using the application. Explicit user inputs can also be used to identify potential performance issues. For example, a "Report a Problem" link can be persistently displayed within the application, where selection of the link launches the chatbot 114.

Finally, still other implementations of the chatbot 114 detect a potential application performance issue by predicting future properties of the application based on factors such as trends in current performance of the application or current use of the application. For example, the chatbot 114 predicts, based on currently available memory and the actions being taken by a user, that the application will likely run out of available memory soon.

While conversing with the user, the chatbot also interfaces with the operating system 116 and/or the memory 118 to retrieve contextual data associated with the operation of the application 112 or the user device 110 coinciding with or leading up to the performance issue. Rather than asking the user to provide information that is already stored in the memory 118 or generating a crash report without interacting with the user, the chatbot 114 retrieves information that is relevant to a prompt or user answer during the conversation with the user. The contextual data contains information that may be indicative of or helpful to understand performance issues of the application, while being itself contextualized by the user answers that accompanied the retrieval of the contextual data. In some implementations, the chatbot 114 retrieves the contextual data by invoking an API associated with another system or component of the user device 110. In other implementations, the user device 110 saves some types of contextual information to a file stored in the memory 118, and the chatbot 114 retrieves the contextual information by reading the file.

Instead of or in addition to retrieving the contextual data from the operating system or memory, some implementations of the chatbot 114 retrieve information from devices external to the user device 110. For example, the chatbot 114 can retrieve contextual information from the network 130 (such as an amount of congestion on the network) or from an external news data source (such as information about a natural calamity in the location of the device 110 that might impact the availability of the network 130).

The chatbot 114 can retrieve different types of contextual data during a conversation, where the types of data retrieved by the chatbot can be determined based at least in part on the prompts output by the chatbot and/or the user answers to the prompts. The chatbot 114 can automatically retrieve some types of contextual data after certain prompts are output or certain user answers are received. For other types of contextual data, the chatbot 114 can ask the user for permission to retrieve the data. For example, if the chatbot determines the user's location is relevant data that should be retrieved, the chatbot outputs a prompt to ask the user for permission to retrieve the location data.

The diagnostic system 120 facilitates operation of the chatbot and diagnoses performance issues on the user device 110 based on data collected by the chatbot. The diagnostic system 120 can include any of a variety of processing systems, such as one or more servers or server clusters.

The diagnostic system 120 includes a rules engine 122 that builds and maintains a conversation model for use by the chatbot 114. In general, the conversation model enables the chatbot 114 to output a sequence of prompts in a conversation with a user and to gather relevant contextual data in order to acquire information about a performance issue on the user device 110. The conversation model can be applied by the chatbot 114, the diagnostic system 120, or both to generate the prompts and to cause the chatbot 114 to gather contextual data. For example, the conversation model can be transmitted to the user device 110, which the chatbot applies locally to collect diagnostic information without communicating with the diagnostic system 120. Alternatively, the chatbot 114 sends some or all of the user answers to the diagnostic system 120 during the conversation, where the diagnostic system 120 applies the conversation model to select a next prompt based on the user answer and provides the prompt to the chatbot 114 for output to the user.

In some implementations, the conversation model is a rule-based model, structured for example as a tree, that causes the chatbot 114 to walk through a proscribed set of prompts. After each prompt, the model causes the chatbot 114 to select one of a subset of predefined next prompts based on the user's answer.

In other implementations, the conversation model comprises a machine learning model trained to generate chatbot prompts. A "machine learning model," as used herein, refers to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include: neural networks, support vector machines, decision trees, Parzen windows, Bayes clustering, reinforcement learning, probability distributions, decision trees, decision tree forests, and others. Models can be configured for various situations, data types, sources, and output formats.

In some implementations, the machine learning model used for the conversation model can be a neural network with multiple input nodes that receive an input data point or signal, such as a question in a customer service script. The input nodes can correspond to functions that receive the input and produce results. These results can be provided to one or more levels of intermediate nodes that each produce further results based on a combination of lower level node results. A weighting factor can be applied to the output of each node before the result is passed to the next layer node. At a final layer ("the output layer"), one or more nodes can produce a value classifying the input that, once the model is trained, can be used to select a next question for a customer service interaction. In some implementations, such neural networks, known as deep neural networks, can have multiple layers of intermediate nodes with different configurations, can be a combination of models that receive different parts of the input and/or input from other parts of the deep neural network, or are convolutions—partially using output from previous iterations of applying the model as further input to produce results for the current input.

A machine learning model can be trained with supervised learning, where the training data includes inputs and desired outputs. A representation of a conversation to resolve application performance issues can be provided to the model. The representation can include, for example, a customer service script that is provided for use by a representative when a customer calls a support line associated with the application 112. Other conversation representations can include transcriptions of actual customer service conversations (e.g., including both the questions asked by the representative and the answers given by the customer) or other chatbot conversations. Outputs from the model, such as next questions in a conversation given a previous question or user answer, can be compared to the desired output and, based on the comparison, the model can be modified, such as by changing weights between nodes of the neural network or parameters of the functions used at each node in the neural network (e.g., applying a loss function). After applying each of the data points in the training data and modifying the model in this manner, the model can be trained to evaluate new data points (such as a new user response to a new question) to generate prompts for the chatbot 114.

The conversation model also causes the chatbot 114 to retrieve contextual data from the user device based on one or more of the user answers to the prompts. Like the portions of the conversation model that enable prompt selections, the types of contextual data retrieved at different stages during the conversation can be rule-based or machine learning-based. A rule-based conversation model causes the chatbot 114 to retrieve proscribed data types at one or more stages in a conversation, such as whenever the chatbot outputs a certain prompt or whenever the user gives a certain answer to a certain prompt. A machine learning-based conversation model processes the prompts output by the chatbot or the received user answers to identify a type of contextual data that is relevant to retrieve. The machine learning model can be trained by analyzing, for example, records of past conversations that have been annotated with tags that identify pieces of contextual data as relevant or not relevant, or with tags identify missing types of contextual data.

The user device 110 and diagnostic system 120 can communicate with each other or with other systems via one or more networks 130. The networks 130 can include any of a variety of individual connections via the Internet such as cellular or other wireless networks, such as 4G networks, 5G networks, or WiFi. In some embodiments, the network may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security. The network may comprise any type of computer networking arrangement used to exchange data. For example, the network may be the Internet, a private data network, virtual private network using a public network, and/or other suitable connection(s) that enables systems to send and receive information. The network may also include a public switched telephone network ("PSTN") and/or a wireless network.

Interactive Retrieval of Application Performance Data

Figure 2:
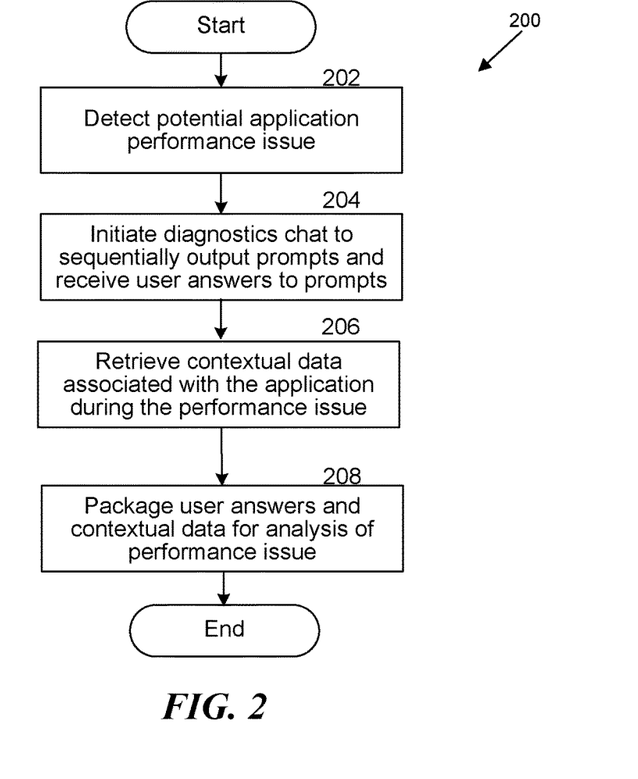
FIG. 2 is a flowchart that illustrates a process for operating a chatbot on a user device to interactively retrieve application performance data associated with an application on the user device.

FIG. 2 is a flowchart that illustrates a process 200 for operating a chatbot on a user device to interactively retrieve application performance data associated with an application on the user device. Steps of the process 200 can be performed by the chatbot 114 executing on the user device 110. Other implementations of the process 200 include additional, fewer, or different steps, or perform the steps in different orders.

As shown at block 202 in FIG. 2, the chatbot 114 detects a potential performance issue associated with an application on the user device 110. Performance issues can be detected automatically, for example by detecting anomalous behaviors associated with the application or by detecting a user action indicative of a performance issue. Alternatively, the chatbot 114 can detect a potential performance issue based on explicit user input, such as a selection of a "Report a Problem" link within the application.

At block 204, the chatbot 114 initiates a diagnostics chat with the user to obtain information about the potential performance issue that was detected. During the conversation, the chatbot 114 sequentially outputs prompts and receives user answers to the prompts. Subsequent prompts in the sequence can be selected based on application of a conversation model that is received from or employed by the diagnostic system 120.

During the diagnostics chat, at block 206, the chatbot 114 retrieves contextual data associated with the application during a time leading up to or coinciding with the performance issue. The type of contextual data retrieved by the chatbot can be selected based at least in part on a prompt output during the chat or a user answer to a prompt. The chatbot 114 can retrieve contextual data multiple times during the chat, and can retrieve different types of contextual data at different points in the chat depending on the prompts or the user answers to the prompts. The types of contextual data retrieved by the chatbot 114, and the timing of their retrieval, can be selected by either the chatbot 114 or the diagnostic system 120 applying the conversation model to the user answers or chatbot prompts.

At block 208, the chatbot 114 packages the user answers and contextual data for analysis of the performance issue. For example, the chatbot 114 sends the user answers and the contextual data to the diagnostic system 120, where the packaged data is stored for analysis in conjunction with user answers and contextual data retrieved from other user devices and/or associated with other applications. The data retrieved by the chatbot 114 can therefore be used as crowdsourced data to improve the functionality or usability of applications, such as detecting bugs in applications, diagnosing and improving network functionality, or identifying nonintuitive user interface elements or application settings that cause a user to expect different application performance.

In an example application of the process 200, the chatbot 114 detects a performance issue when a text messaging application on a user's mobile phone fails to send out the user's SMS messages. If the user agrees to chat with the chatbot 114 about the issue, the chatbot 114 walks through a sequence of questions (whether proscribed or determined in real-time by applying a trained machine learning model to the user's responses) that relate to potential reasons why the application is failing to send messages. For example, the chatbot 114 first asks the user to describe the performance issue the user is experiencing (which, in this case, is the application failing to send out SMS messages). The chatbot 114 analyzes the user's response using the conversation model to select a next prompt. The chatbot 114 can, for example, walk through prompts such as "Is your phone connected to a 4G network or a 5G network?", "Were you trying to send plain text, an image, or a video?", and, if the application issue arose after the user tried to send an image or a video: "Are you able to send a plaintext message?"

At one or more times during the conversation, the chatbot 114 retrieves corresponding contextual data. For example, after the user identifies the performance issue as a failure to send out an SMS message, the chatbot 114 retrieves an identifier of the application through which the user is attempting to send the message. After the user answers a prompt to identify the type of network to which the phone is connected, the chatbot 114 retrieves the user's location and the time of the user's attempts to send the message. Answers to other prompts can cause the chatbot 114 to retrieve other information such as a battery level of a battery in the mobile phone, an amount of free storage available on the mobile phone, an amount of random access memory (RAM) in use at the time the user attempted to send the message, temperature of the phone, or data generated by other applications at the time the user attempted to send the message. In another example, if the performance issue is a recent dropped call, the chatbot 114 collects, over the course of the conversation with the user, contextual information such as call type (e.g., whether it was a cellular or WiFi call), location of the call, time of the call, the duration of the call prior to disconnection, whether the user device 110 was moving during the call, and/or whether the call suffered from any audio issues (such as one-way audio) before being dropped.

The data gathered by the chatbot 114 is sent to the diagnostic system 120, where it can be used to analyze or diagnose the problem. For example, the data gathered by the may indicate that the 5G network to which the mobile phone was connected suffered from limited bandwidth at the time the user was attempting to send messages. This information can inform a network operator's improvements to the 5G network or the phone designer's improvements to the way the mobile phone selects and connects to a network.

Operating a Chatbot to Interactively Retrieve Application Performance Data

Figure 3:
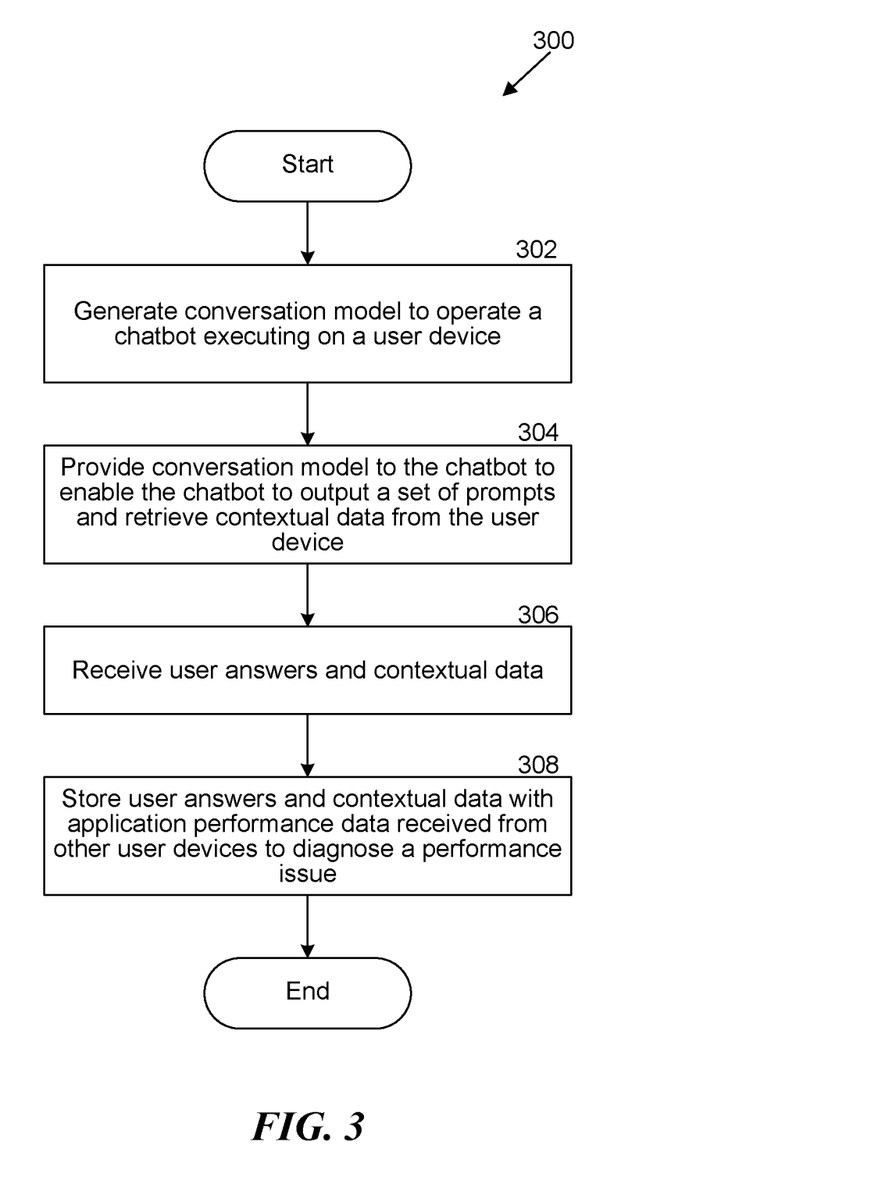
FIG. 3 is a flowchart that illustrates a process for operating a chatbot to interactively retrieve application performance data.

FIG. 3 is a flowchart that illustrates a process 300 for operating a chatbot to interactively retrieve application performance data. Steps of the process 300 can be performed by the diagnostic system 120. Other implementations of the process 300 include additional, fewer, or different steps, or perform the steps in different orders.

At block 302, the diagnostic system 120 generates a conversation model to operate a chatbot on a user device. Application of the conversation model causes the chatbot to output a set of prompts sequentially selected based at least in part on user responses to previous prompts in the set, as well as to retrieve contextual data from the user device. In various implementations, the conversation model is a rule-based model or a trained machine learning model. The rule-based model directs the chatbot to output one of a subset of proscribed prompts based on the previous prompts that have been output or based on user answers to previous prompts. The rule-based model can further direct the chatbot to retrieve specific types of contextual data when outputting certain prompts or in response to certain user answers. Where the conversation model is implemented as a machine learning-based model, the diagnostic system 120 trains the model to generate prompts for output by the chatbot based on previous prompts or user answers to previous prompts, as well as to select types of contextual data that are relevant to retrieve in association with one or more of the prompts. In some implementations, the diagnostic system 120 generates separate conversation models for operating the conversation with the user and retrieving the contextual data. For example, the diagnostic system 120 can generate a rule-based model to control the prompts output by the chatbot and a machine learning-based model to control the types of contextual data retrieved by the chatbot, or vice versa. Furthermore, different conversation models can be generated for different applications, different types of user devices, different types of networks over which the user devices communicate, or for other suitable categories.

At block 304, the diagnostic system 120 provides the conversation model for use by the chatbot 114. For example, the diagnostic system 120 sends the conversation model to the user device 110, where it can be locally used by the chatbot to generate the prompts and select types of contextual data to retrieve. Alternatively, the diagnostic system 120 receives user inputs from the user device and applies the conversation model to generate prompts and contextual data type selections. At block 306, the diagnostic system receives user answers and contextual data collected by the chatbot, based on the chatbot's application of the conversation model.

At block 308, the diagnostic system 120 stores the user answers and contextual data with similar application performance data received from other user devices. The stored data can be used to diagnose the performance issue of the application or to improve the application or a network used by the user device 110.

Computer System

Figure 4:
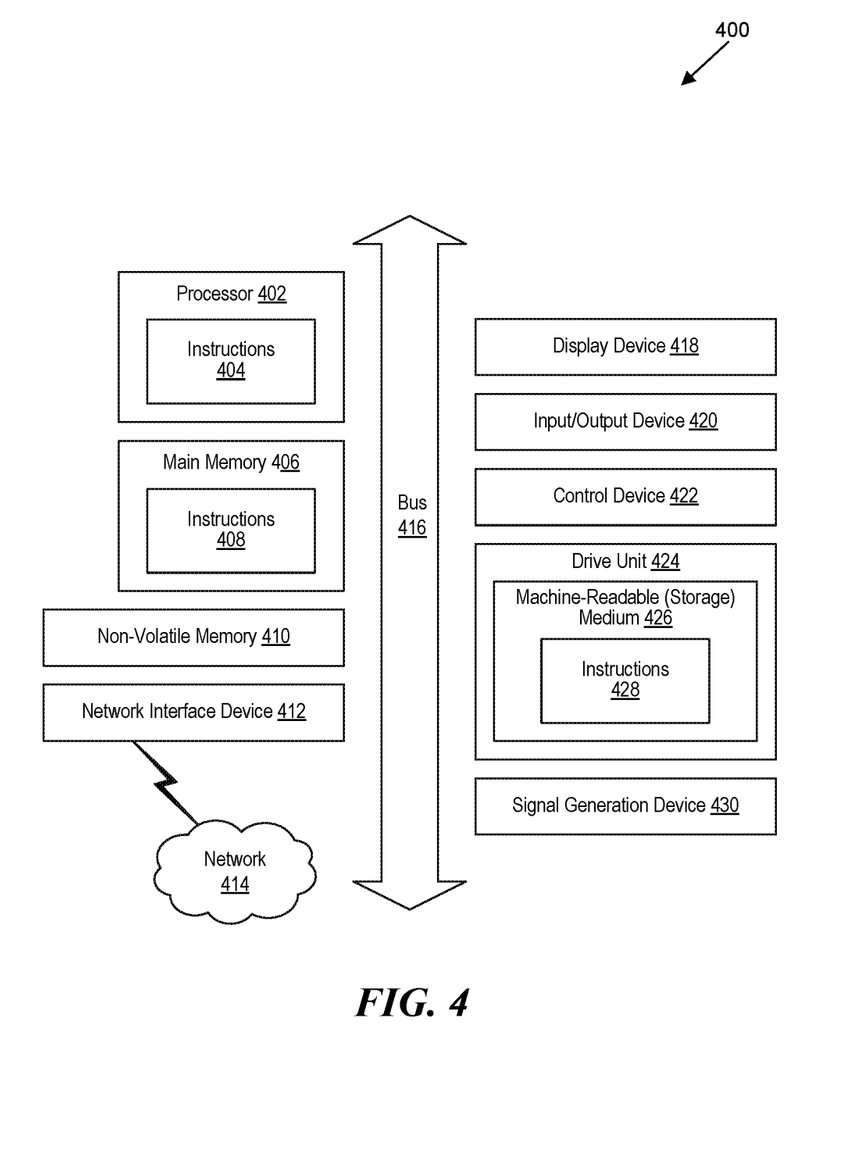
FIG. 4 is a block diagram that illustrates an example of a computer system in which at least some operations described herein can be implemented.

FIG. 4 is a block diagram that illustrates an example of a computer system 400 in which at least some operations described herein can be implemented. For example, one or both of the user device 110 or diagnostic system 120 can be implemented as the computer system 400. As shown, the computer system 400 can include: one or more processors 402, main memory 406, non-volatile memory 410, a network interface device 412, video display device 418, an input/output device 420, a control device 422 (e.g., keyboard and pointing device), a drive unit 424 that includes a storage medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some implementation, the computer system 400 can be an embedded computer system, a system-on-chip (SOC), a single-board computer system (SBC) or a distributed system such as a mesh of computer systems or include one or more cloud components in one or more networks. Where appropriate, one or more computer systems 400 can perform operations in real-time, near real-time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation.

The applicant reserves the right to pursue such additional claim forms in either this application or in a continuing application.

I claim:

1. A method for interactively gathering performance data associated with an application executed on a user device, the method comprising:
   receiving at a chatbot executed by a user device, a plurality of answers from a user of the user device to a plurality of prompts sequentially output by the chatbot to the user during a diagnostics chat with the user regarding a performance issue of an application on the user device;
   during the diagnostics chat, invoking, by the chatbot, an application programing interface (API) associated with an operating system of the user device to retrieve contextual data from the operating system during the performance issue, wherein invoking the API to retrieve the contextual data comprises:
      after the chatbot outputs a first prompt to the user, receiving a first user answer to the first prompt;
      identifying a type of the contextual data to retrieve based on a model that maps the first prompt or the first answer to the type of the contextual data; and
      causing the API to selectively retrieve the identified type of contextual data; and
   packaging, by the chatbot, the plurality of answers from the user and the retrieved contextual data for diagnosis of the performance issue of the application.

2. The method of claim 1, wherein receiving the plurality of answers from the user to a plurality of prompts sequentially output by the chatbot comprises:
   outputting a first prompt by the chatbot;
   receiving at the chatbot, a first user answer to the first prompt;
   invoking the API to retrieve a first type of contextual data selected based on the first user answer; and
   selecting a second prompt for output by the chatbot based on the first user answer.

3. The method of claim 1, wherein the chatbot selects each prompt in the plurality of prompts using a conversation model.

4. The method of claim 1, further comprising:
   detecting, by the chatbot, the performance issue of the application; and
   launching the diagnostics chat in response to detecting the performance issue.

5. The method of claim 4, wherein detecting the performance issue of the application comprises detecting anomalous behavior of the application.

6. The method of claim 4, wherein detecting the performance issue of the application comprises detecting a user action that indicates a behavior of the application is different than expected by the user.

7. The method of claim 1, further comprising:
   retrieving a first type of contextual data after receiving a first user answer during the diagnostics chat; and
   retrieving a second type of contextual data after receiving a second user answer during the diagnostics chat.

8. The method of claim 7, wherein the first type of contextual data and the second type of contextual data are each selected for retrieval based on applying a conversation model.

9. The method of claim 1, wherein the contextual data comprises data generated by the application.

10. The method of claim 1, wherein the contextual data comprises data generated by a component of the user device other than the application.

11. At least one computer-readable storage medium, excluding transitory signals and carrying instructions, which, when executed by at least one data processor of a system, cause the system to:
    receive a plurality of answers from a user of a user device to a plurality of prompts sequentially output to the user during a diagnostics chat with the user regarding a performance issue of an application on the user device;
    during the diagnostics chat, invoking an operating system application programming interface (API) or a memory API of the user device to retrieve contextual data of the application during the performance issue from an operating system or memory of the user device, wherein invoking the operating system API or the memory API to retrieve the contextual data comprises:
       after a first prompt has been output to the user, receiving a first user answer to the first prompt;
       identifying a type of the contextual data to retrieve based on a model that maps the first prompt or the first answer to the type of the contextual data; and
       causing the operating system API or the memory API to selectively retrieve the identified type of contextual data; and
    packaging the plurality of answers from the user and the retrieved contextual data for diagnosis of the performance issue of the application.

12. The at least one computer readable storage medium of claim 11, wherein the instructions when executed further cause the system to:
    detecting the performance issue of the application; and
    launch the diagnostics chat in response to detecting the performance issue.

13. The at least one computer readable storage medium of claim 12, wherein the instructions when executed further cause the system to:
    detecting anomalous behavior of the application; or
    detecting a user action that indicates a behavior of the application is different than expected by the user.

14. The at least one computer readable storage medium of claim 11, wherein retrieving the contextual data during the diagnostics chat comprises:
    retrieving a first type of contextual data after receiving a first user answer during the diagnostics chat; and
    retrieving a second type of contextual data after receiving a second user answer during the diagnostics chat.

15. The at least one computer readable storage medium of claim 11, wherein the contextual data comprises data generated by a component of the user device other than the application.

16. A system, comprising:
    at least one hardware processor; and
    at least one non-transitory memory storing instructions, which, when executed by the at least one hardware processor, cause the system to:
       generate a chatbot conversation model to operate a chatbot executing on a user device, wherein the chatbot conversation model causes the chatbot to:
          output a set of prompts sequentially selected based at least in part on user responses to previous prompts in the set,
          map a prompt in the set of prompts or a user response to a type of contextual data, and
          invoke an operating system application programming interface (API) or a memory API of the user device to selectively retrieve, from an operating system or a memory of the user device, a first contextual data item that is identified based on the mapping of the prompt or the user response to the type of contextual data;

provide the chatbot conversation model to the chatbot to enable the chatbot to output the set of prompts and retrieve the first contextual data item from the user device;

receive from the chatbot, user answers to prompts output by the chatbot and the first contextual data item retrieved from the user device by the chatbot; and store the user answers and the first contextual data item.

17. The system of claim 16, wherein the chatbot conversation model comprises a set of rules that cause the chatbot to output a subsequent prompt selected from a subset of subsequent prompts, based on a user answer to a previous prompt.

18. The system of claim 16, wherein the chatbot conversation model comprises a machine learning model trained using customer service scripts associated with an application executed by the user device, and wherein the chatbot conversation model causes the chatbot to select a subsequent prompt based on processing a previous prompt using the machine learning model.

19. The system of claim 16, wherein the chatbot conversation model comprises a set of rules that cause the chatbot to retrieve a specified type of contextual data based on the first user response.

20. The system of claim 16, wherein the chatbot conversation model comprises a machine learning model trained to cause the chatbot to retrieve a selected type of contextual data based on processing the first user response using the machine learning model.

* * * * *